United States Patent [19]

Kawanishi et al.

[11] Patent Number: 5,981,881
[45] Date of Patent: Nov. 9, 1999

[54] WEIGHING SYSTEM

[75] Inventors: Shozo Kawanishi; Hiroshi Higuchi, both of Hyogo, Japan

[73] Assignee: Yamato Scale Co., Ltd., Hyogo, Japan

[21] Appl. No.: 08/916,687

[22] Filed: Aug. 22, 1997

[30] Foreign Application Priority Data

Aug. 23, 1996 [JP] Japan .................................. 8-222140
Jan. 30, 1997 [JP] Japan .................................. 9-017052

[51] Int. Cl.$^6$ .............................................. G01G 13/00
[52] U.S. Cl. ........................................ 177/25.18; 702/101
[58] Field of Search ........................ 177/25.14, 25.18; 702/101, 102; 705/414, 415, 416

[56] References Cited

U.S. PATENT DOCUMENTS

| | | | |
|---|---|---|---|
| 4,658,919 | 4/1987 | Nobutsugu | 177/25.18 |
| 4,694,920 | 9/1987 | Naito et al. | 177/25 |
| 4,727,947 | 3/1988 | Naito | 177/164 |
| 4,771,836 | 9/1988 | Naito et al. | 177/25.18 |
| 4,804,052 | 2/1989 | Griffen | 177/25.14 |
| 4,813,205 | 3/1989 | Mikata et al. | 53/53 |
| 4,815,547 | 3/1989 | Dillon et al. | 177/25.14 |
| 4,840,240 | 6/1989 | Toyoda et al. | 177/25.18 |
| 4,846,291 | 7/1989 | Osawa et al. | 177/25.18 |
| 4,850,442 | 7/1989 | Naito et al. | 177/164 |
| 4,901,506 | 2/1990 | Weyandt | 53/479 |
| 5,076,375 | 12/1991 | Dillon et al. | 177/25.19 |
| 5,815,722 | 9/1998 | Kalwitz et al. | 395/712 |

FOREIGN PATENT DOCUMENTS

| | | | |
|---|---|---|---|
| 0103475 A2 | 3/1984 | European Pat. Off. | B65B 1/32 |
| 0284753 | 10/1985 | European Pat. Off. | G01G 23/01 |
| 0319202 A2 | 6/1989 | European Pat. Off. | G01G 23/37 |
| 61196125 | 2/1985 | Japan | G01G 13/00 |
| 08210908 | 10/1995 | Japan | G01G 19/387 |

OTHER PUBLICATIONS

Kerl, H.D., Ein Kommunikationssystem nicht nur für die Wagetechnik, Messen Prufen Automatisieren, Internationales Fachjournal Fur Messsteuer und Regeltechnik, No. 7–8, Jul. 1985, pp. 396–399.

Clevermann, K., "Entwicklungstendenzen in der automatisierten Wagetechnik," Technisches Messen TM. 1982–1988, Incomplete, vol. 58, No. 5, May 1991, pp. 184–187.

Database Inspec, Institute of Electrical Engineers, Stevenage, GB, Inspec No. 3023394, 1987, Pyzik, A.T., "The DISKOS distributed system for control of technological processes".

Buchen, W., "Fortschritte in der Mess und Automatisierung–stechnik durch Infomrationstechink," Interkama Kongress 1986 Dusselforf, 6–11 Oct. 1986, pp. 826–835.

Kerl, H.D., "A Communication System Not Only for Weighing Techniques," Messen Prufen Automatisieren, Internationales Fachjournal für Mess–Steuer– Und Regeltechnik, No. 7–8, Jul. 1985, pp. 396–399 (English Translation).

Clevermann, K., "Development Trends in Automated Weighing Techniques," Messen Tm. 1982–1988, Incomplete, vol. 58, No. 5, May 1991, pp. 184–187 (English Translation).

Graf, Rudolph F., "Modern Dictionary of Electronics, Sixth, Ed." Prentice Hall Computer Publishing, Carmel, Indiana, pp. 570–571, 1984.

Primary Examiner—Randy W. Gibson
Attorney, Agent, or Firm—Senniger, Powers, Leavitt & Roedel

[57] ABSTRACT

A weighing system having excellent, quick response to control information and capable of easily adding and changing hardware. A weighing driving section 12 is provided on each weighing unit 11 forming a combination scale. The weighing driving section 12 is formed by a CPU board 13, motor drivers 14 and 15 for driving stepping motors 18 and 19, an A/D converter 16 for A/D converting a weighed value sent from a load cell 20, and a feeder driver 17 for driving a feeder 21. The CPU board 13 is connected to a LAN cable 23 through a LAN interface 22. A weighing control unit 26 for giving control information to the weighing driving section 12 of the weighing unit 11 is provided. The weighing control unit 26 is connected to the LAN cable 23 through a LAN board.

11 Claims, 9 Drawing Sheets

WEIGHING SYSTEM

BACKGROUND OF THE INVENTION

1. Field of the Invention

The present invention relates to a weighing system, and more particularly to a weighing system in which a weighing driving section of each of a plurality of weighing units, a weighing control section for controlling the weighing driving section and the like are coupled through a LAN.

2. Description of the Related Art

Conventionally, a weighing system which functions as a combination scale comprises a plurality of weighing units, each of which includes a hopper, a load cell and the like. Articles (e.g, potato chips) to be weighed are fed to these units and weighed. The weights of the articles in the units are then combined to form combination weights, as will be understood by those familiar with combination scales. A combination weight fully within an acceptable range of weights is selected and the articles in the corresponding weighing units are discharged for delivery to a packer, such as a vertical form-fill-seal machine which operates to pack the measured weight of articles into a bag made by the packer. Each weighing unit is controlled by a weighing control unit comprising a single CPU.

As the number of the weighing units forming the weighing system becomes larger, the number of possible combinations which can be calculated necessarily increases, which increases the load on the CPU. For this reason, a single CPU cannot completely perform in a sufficiently short time all the calculations in some cases. Therefore, a system in which a plurality of CPUs are provided to share the processing is sometimes employed. In some cases where the load is further increased, a weighing system is employed in which a weighing driving section formed by a single CPU is provided for each weighing unit. In a system wherein one weighing driving section is provided for each weighing unit, a weighing control unit having one CPU for controlling the whole combination scale is usually provided. The weighing control unit is connected, through an ordinary serial telecommunication line, to all the weighing driving sections provided on the weighing units.

In systems in which the number of weighing driving sections is predetermined and relatively small, the weighing driving sections are connected to the weighing control units through the serial telecommunication line as described above. However, if the number of the weighing units is increased or the packing speed of the packer is increased, it is impossible to quickly respond to data such as operating conditions or control information between the weighing control section of the weighing control unit and the weighing driving section of the weighing unit. Also, if a program to be executed by the weighing driving section is to be exchanged, updated or the like, it is necessary to exchange the program of all the weighing driving sections. Furthermore, abnormalities of the telecommunication line such as disconnection are found with difficulty if they are caused.

SUMMARY OF THE INVENTION

In order to solve the above-mentioned problems of the prior art, it is an object of the present invention to provide a weighing system which is excellent in quick response to data such as operating conditions and control information, can easily accept a new or modified program to be executed by each weighing driving section, and can easily detect abnormalities of a LAN such as disconnection.

The present invention provides a weighing system in which quick response to control information, operating information or the like can be achieved by connecting a weighing driving section of each weighing unit and a weighing control unit through a LAN capable of performing high-speed communication. Furthermore, an execution program of the weighing driving section can be exchanged, updated or the like at a high speed by using the LAN. In addition, a diagnostic function of the LAN can easily be fulfilled by sending, to each weighing unit, necessary operating information when starting the weighing system and sending various continuous instructions during operation, and judging that the weighing unit to which a response signal has been sent is normal and that the weighing unit to which the response signal has not been sent is abnormal.

The problems of the prior art can be solved by employing the LAN for the weighing system forming the combination scale according to the present invention. More specifically, the weighing driving section of the weighing unit is coupled to the weighing control section of the weighing control unit trough the LAN so that the control information and data can be transferred at a high speed.

The present invention also permits the software program of the weighing driving section of the weighing unit to be exchanged for an upgraded version so that data can be transferred at a higher speed from the weighing control section of the weighing control unit through the LAN. Accordingly, the present invention allows the amount of time needed to execute the version of the program in the weighing control section to be reduced by upgrading the software of the weighing driving section.

Furthermore, by using the LAN , it is possible to confirm that the operating information and the instructions are sent and received to and from the weighing unit. Consequently, the weighing control section and the like can have the diagnostic function easily. Accordingly, abnormalities of the LAN can easily be detected before the operation of the weighing system is started and during the operation.

DETAILED DESCRIPTION OF PREFERRED EMBODIMENTS

Figure 1:
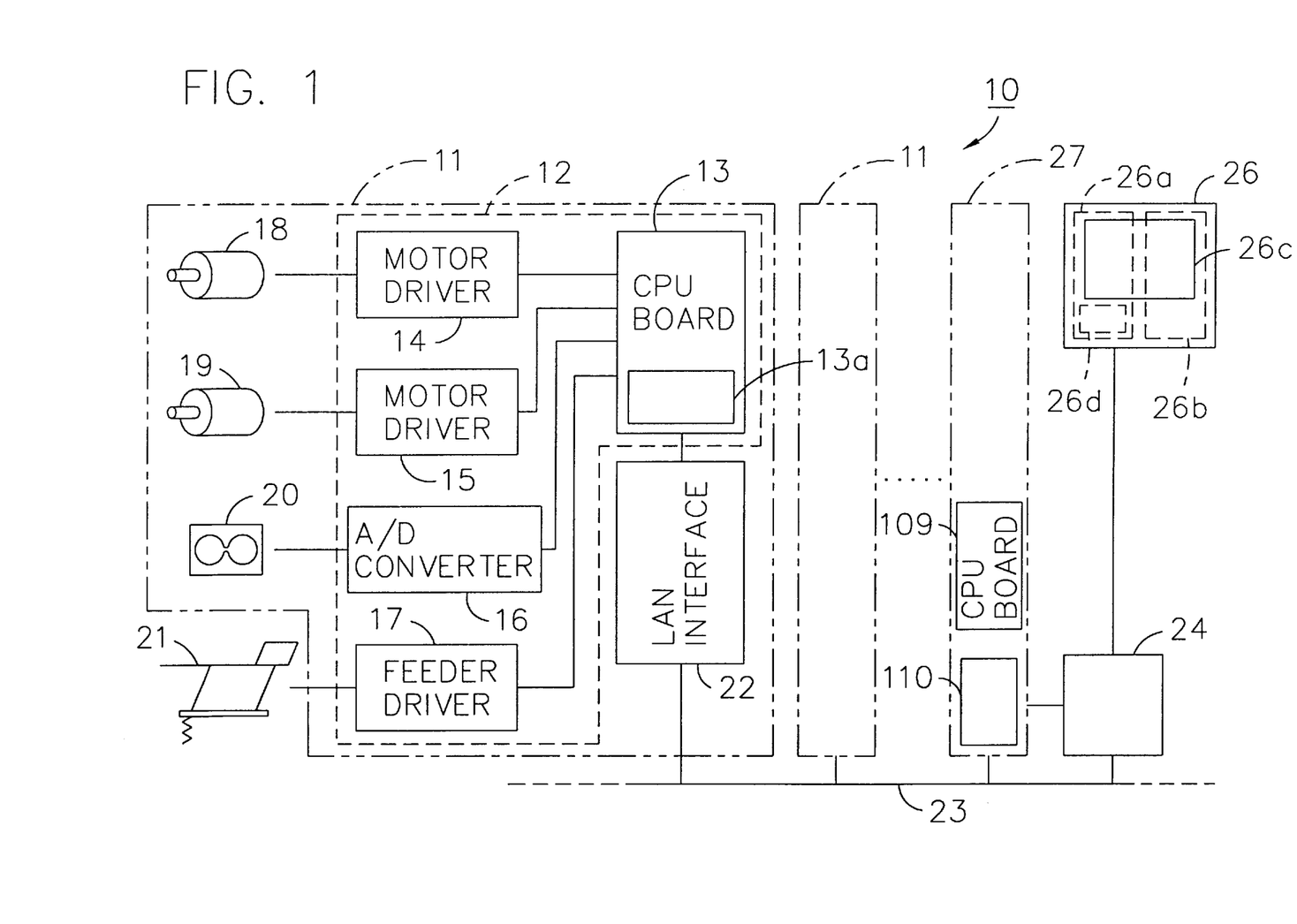
FIG. 1 is a block diagram showing a schematic structure of a weighing system according to an embodiment of the present invention.
Figure 2:
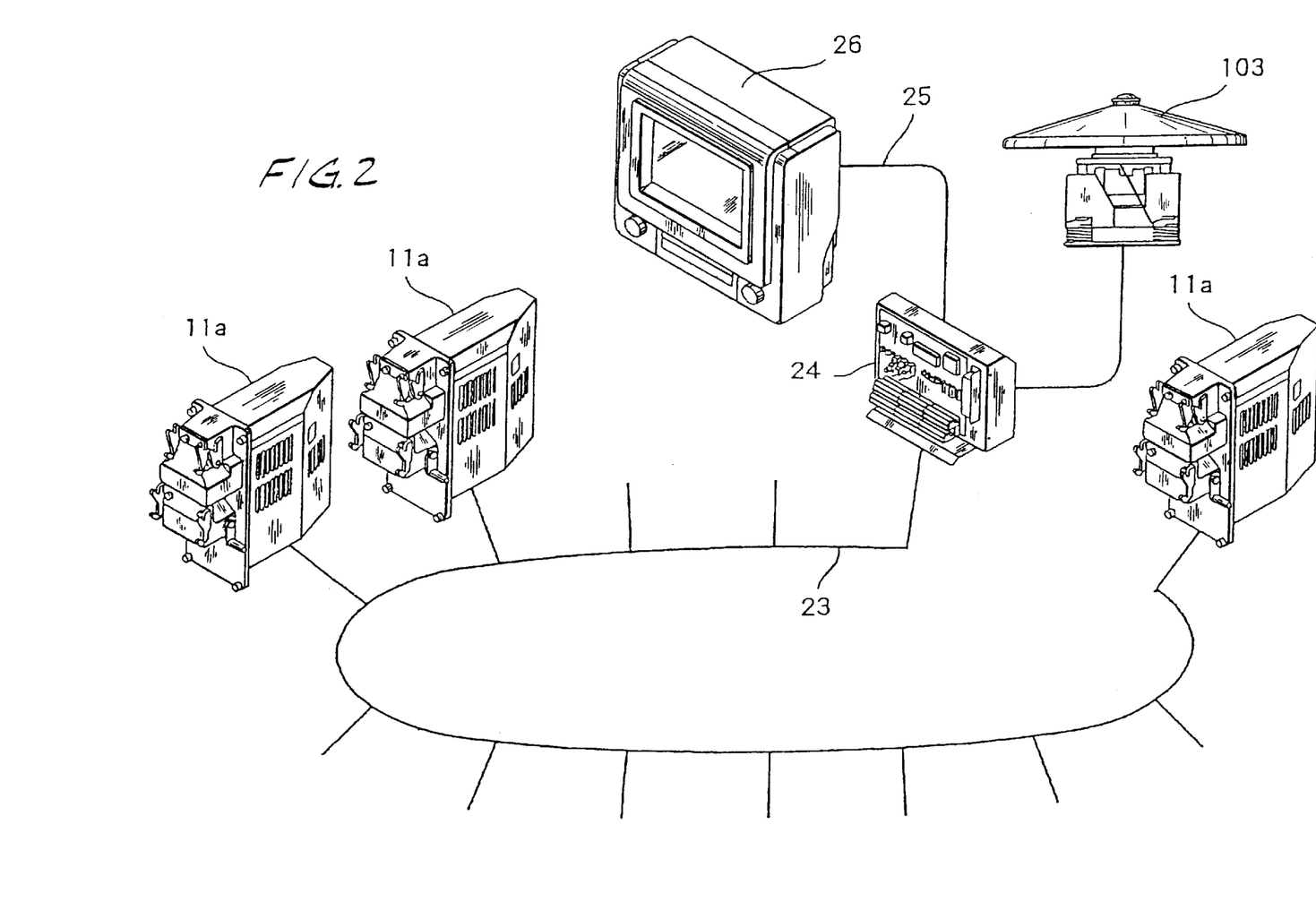
FIG. 2 is a view conceptually showing the weighing system in FIG. 1.
Figure 3:
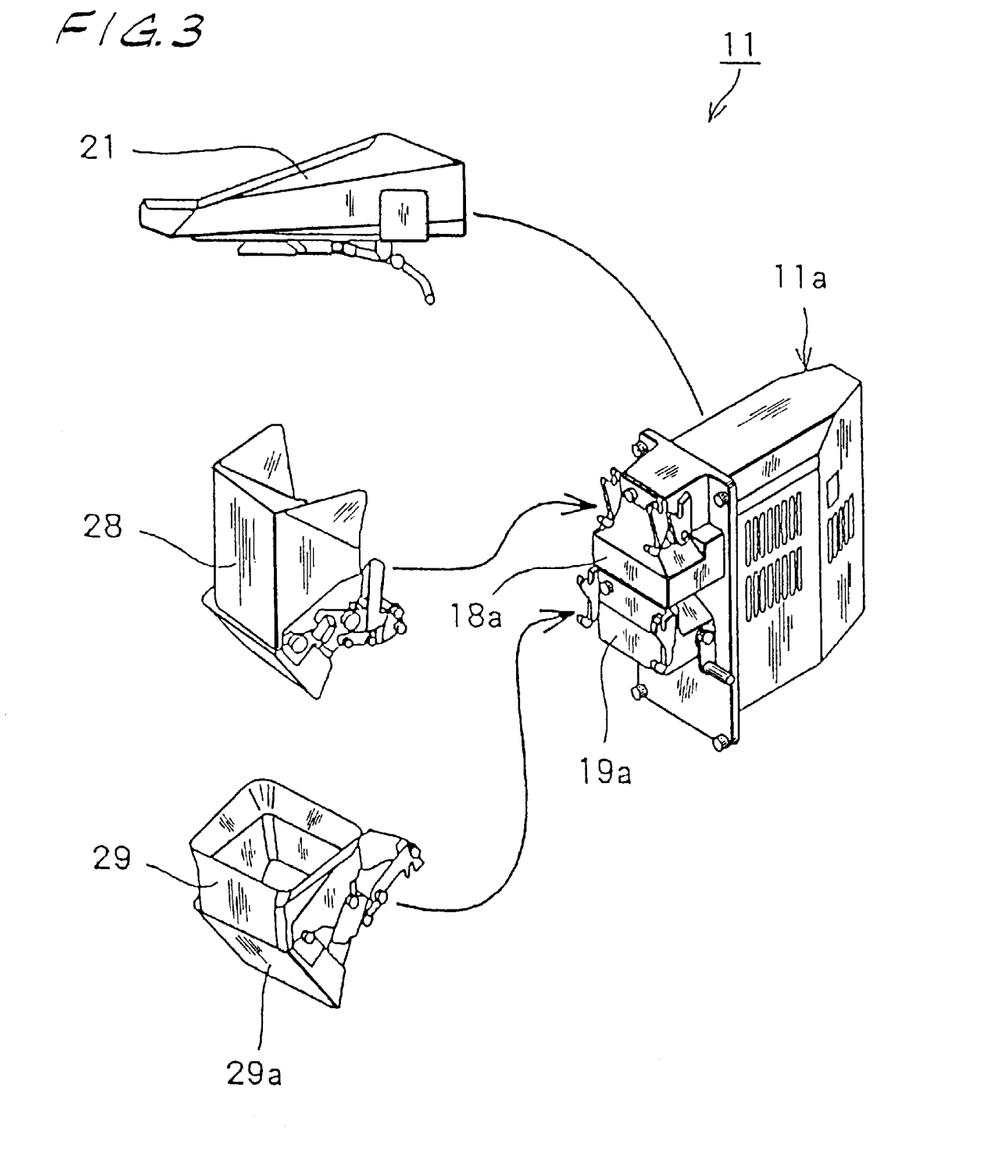
FIG. 3 is a perspective view showing a structure of a weighing unit in FIG. 1.

FIG. 1 is a block diagram showing a schematic structure of a weighing system 10 according to an embodiment of the present invention. FIG. 2 is a view conceptually showing the weighing system 10. FIG. 3 is a perspective view showing a structure of a weighing unit 11 which will be described below. As shown in FIG. 1, the weighing system 10 according to the present embodiment comprises a combination scale (not shown) formed by a plurality of weighing units 11, each of which has a weighing driving section 12 for performing weighing operation. The weighing driving section 12 includes a CPU board 13, motor drivers 14 and 15 for driving stepping motors 18 and 19 respectively, an A/D converter 16 for A/D converting a weighed value of articles sent from a load cell 20, and a feeder driver 17 for driving a feeder 21. The CPU board 13 has a flash memory 13a for storing an execution program and the like. In the present embodiment, the weighing unit 11 does not include the feeder 21, but it does include the feeder driver 17.

The CPU board 13 is connected to a LAN cable 23 through a LAN interface 22. While the feeder driver 17 is included in the weighing unit 11 in the present embodiment, the feeder driver 17 may be attached to the feeder 21 to which only a control signal is sent from the weighing unit 11.

As shown in FIG. 3, the weighing unit 11 has a weighing unit body 11a. The feeder 21 which is driven by the feeder driver 17 (FIG. 1) is attached to a top of the weighing unit body 11a. The feeder operates to feed a quantity of articles to be weighed to a feed hopper 28 adjacent the weighing unit body 11a. A stepping motor 18 (FIG. 1) operates an actuating device 18a on the weighing unit body 11a for opening and closing a gate of the feed hopper 28. The feed hopper 28 is removably attached to the actuating device 18a. The stepping motor 18 and actuating device 18a function as actuating means for operating the feed hopper 28. A weighing hopper 29 is positioned below the feed hopper 28 for receiving articles discharged from the feed hopper. A stepping motor 19 (FIG. 1) operates an actuating device 19a on the weighing unit body 11a for opening and closing a gate 29a of the weighing hopper 29. The weighing hopper 29 is removably attached to the actuating device 19a. The stepping motor 19 and actuating device 19a function as actuating means for operating the weighing hopper 29. A solenoid, an air cylinder, a servo motor and the like can be used as the actuating device for the hoppers 28 and 29. The motor drivers 14 and 15, the A/D converter 16 and the feeder driver 17 are controlled by the CPU board 13. For simplicity, only the weighing unit body 11a is shown in FIG. 2. While only the feed hopper 28 and the weighing hopper 29 are provided as described above, a memory hopper 31 M for holding weighed articles can further be provided, for example, as will be understood by those skilled in the field of combination weighing machines.

Figure 4:
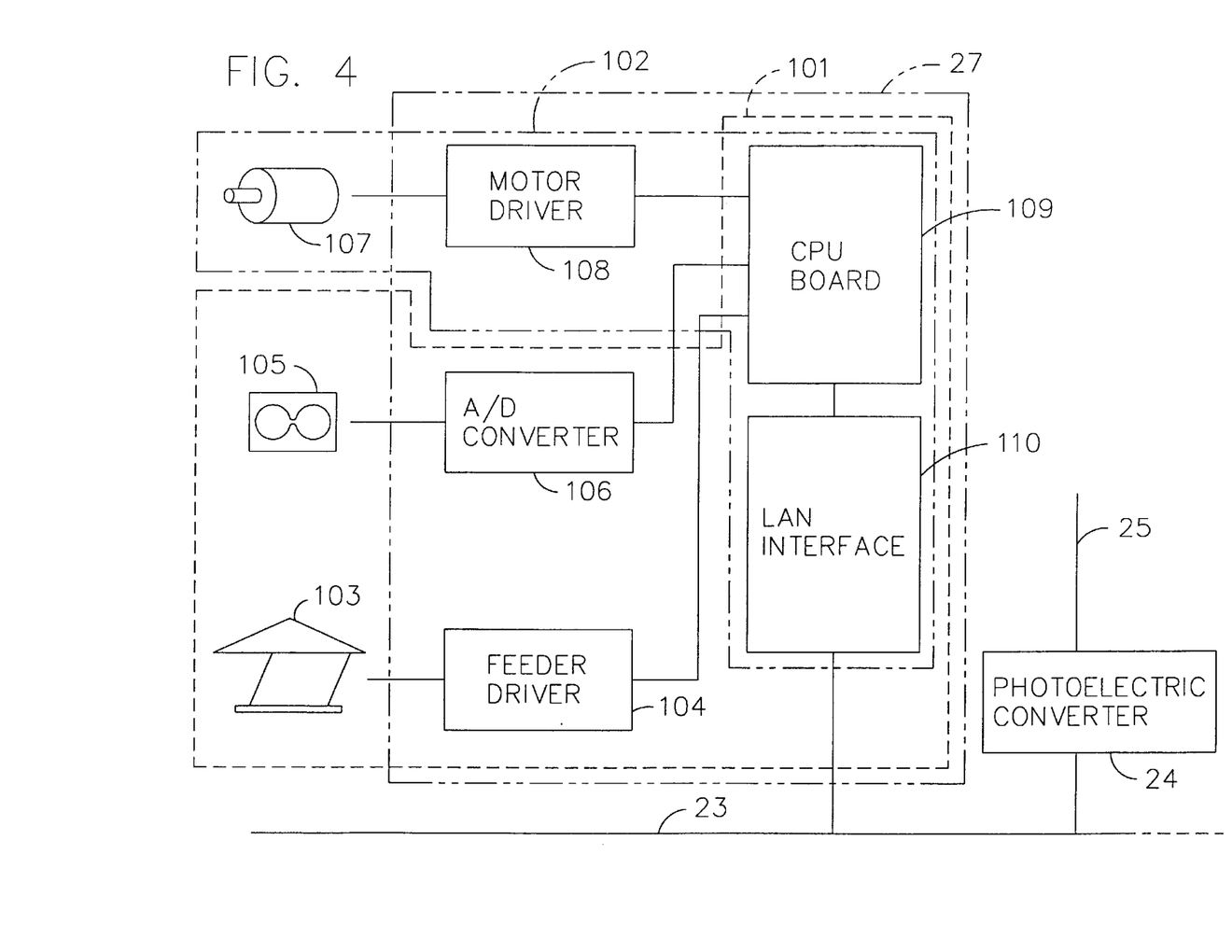
FIG. 4 is a block diagram showing a structure of a feed—discharge control section in FIG. 1.

As shown in FIG. 1, the weighing system 10 according to the present embodiment comprises a feed—discharge control section 27 for controlling feed and discharge of an article to be weighed. FIG. 4 shows a block structure of the feed—discharge control section 27. As shown in FIG. 4, the feed—discharge control section 27 includes a center vibrator unit 101 and an assembled gate unit 102.

The center vibrator unit 101 has a center vibrator 103 for feeding articles to be weighed to the feeder 21 of the weighing unit 11 by vibration, and a feeder driver 104 for driving the center vibrator 103. The feeder driver 104 operates under the control of a CPU board 109 to regulate the quantity of articles fed from the center vibrator 103 to the feeder 21 (FIG. 3) of each weighing unit 11. The center vibrator unit 101 has an A/D converter 106 for A/D converting a weighed value in a level sensor load cell 105 for weighing the articles on the center vibrator 103. A digital value obtained by conversion is sent to the CPU board 109. The CPU board 109 is connected to the LAN cable 23 through a LAN interface 110. In the present embodiment, the center vibrator unit 101 is formed by the center vibrator 103, the feeder driver 104, the A/D converter 106, the CPU board 109 and the LAN interface 110. The CPU board 109 and the LAN interface 110 are shared with the assembled gate unit 102, which will be described below.

An optical sensor for product level detection and an optical sensor controller can be used in place of the level sensor load cell 105 and the A/D converter 106. The level sensor load cell 105 and the optical sensor for product level detection function as means for detecting a quantity of the articles on the center vibrator to be weighed. The A/D converter 106 and the optical sensor controller function as digital converting means.

Figure 5A:
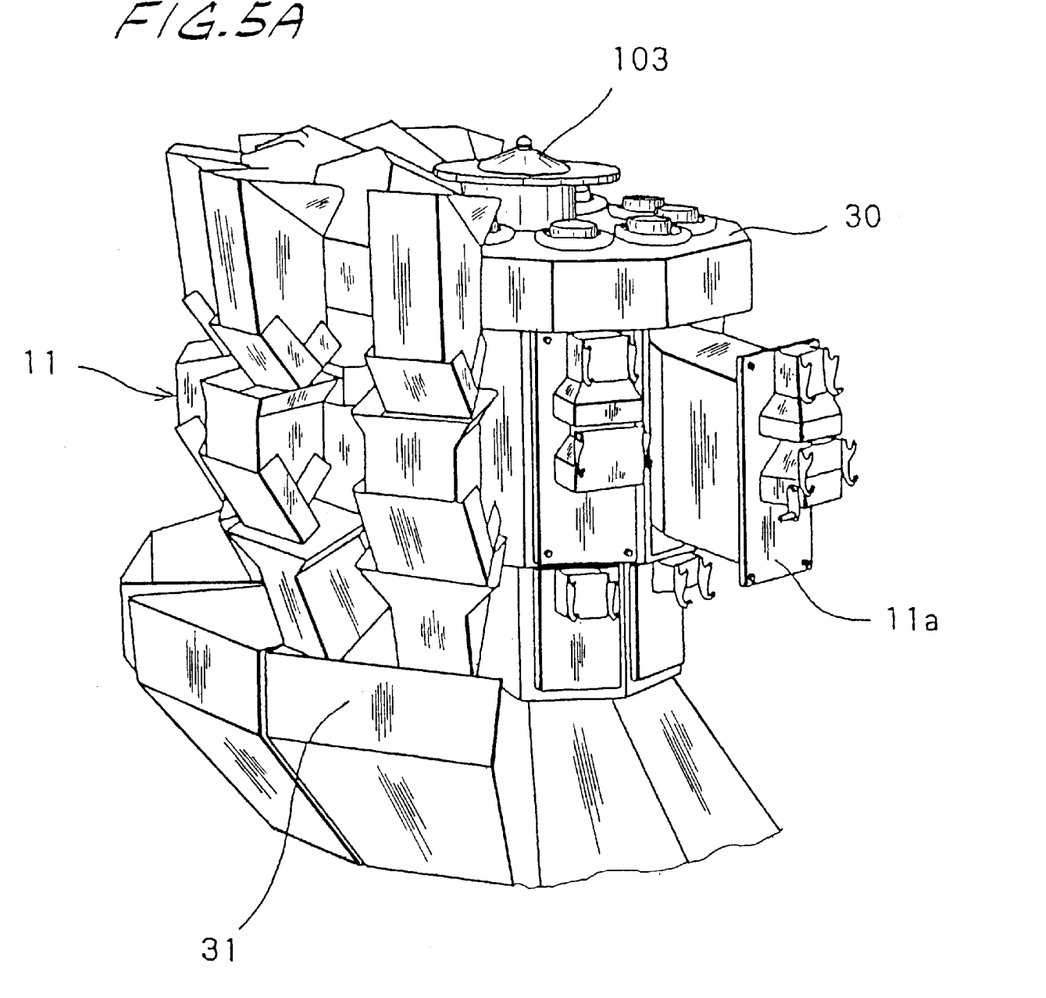
FIG. 5A is a perspective view showing an external structure of the weighing system in FIG. 1.
Figure 5B:
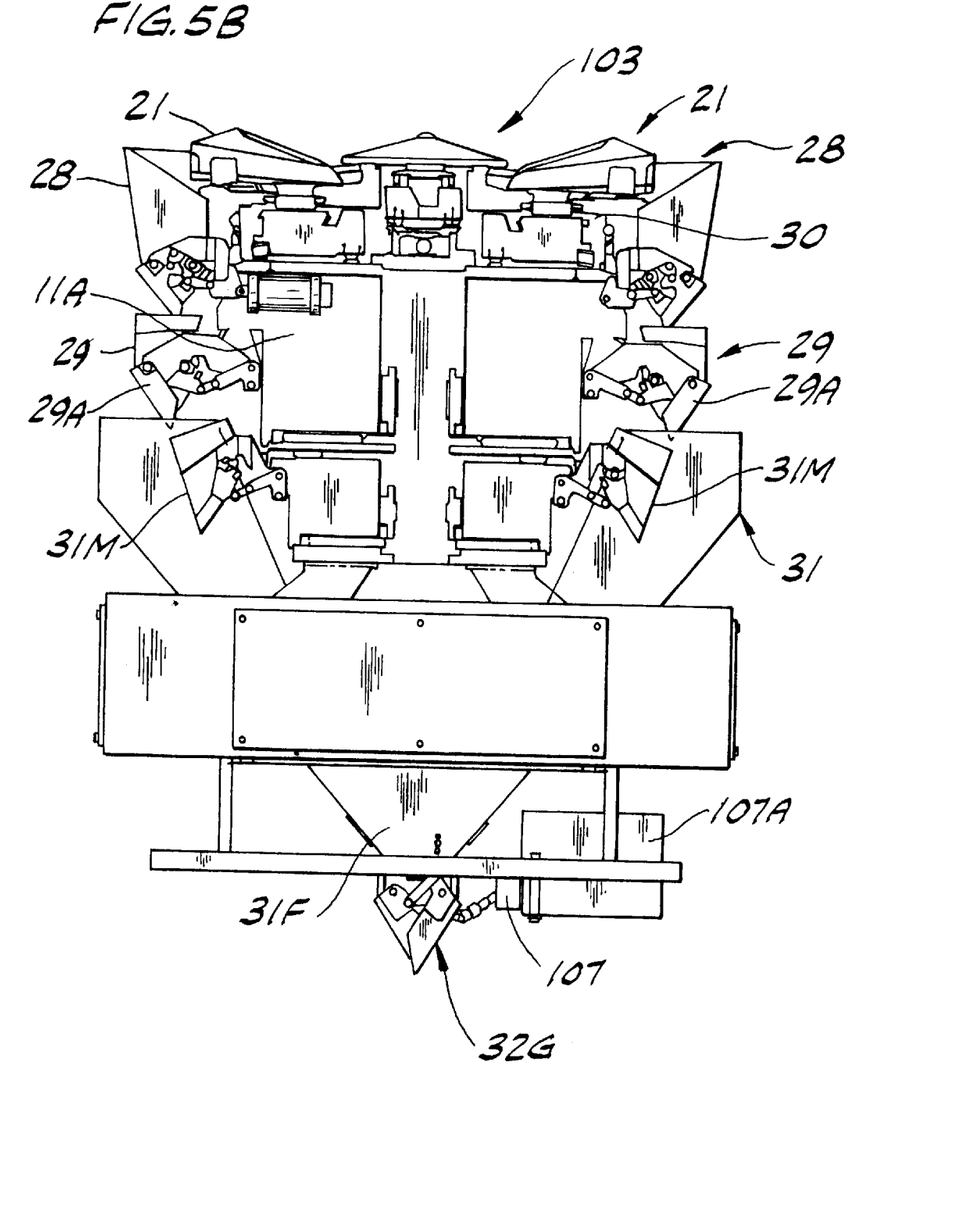
FIG. 5B is a schematic side plan view showing an external structure of the weighing system in FIG. 1.

As will be understood by those skilled in the field of combination weighing, the weighing system 10 is operable to calculate combinations of weights held by the weighing hoppers 29 of the weighing units 11 and then to select a combination of weights falling within a predetermined target range of weights. The articles in the weighing hoppers 29 corresponding to the selected combination are discharged from the hoppers into a collection chute 31, as shown in FIG. 5A and 5B. The assembled gate unit 102 comprises a chute gate 32G provided in a lower portion of the collection chute 31. The chute gate is opened and closed by a chute gate motor 107 which is part of the chute gate actuating means 107A. When the chute gate is closed, articles are stored within the collection chute; when the gate is opened, articles in the chute are discharged from the chute for delivery to a packer in a predetermined timing (i.e., in timed relationship with the operation of the packer). The chute gate motor 107 is driven by a motor driver 108 under control of the CPU board 109. In the present embodiment, the assembled gate unit 102 is formed by the chute gate motor 107, the motor driver 108, the CPU board 109 and the LAN interface 110. The CPU board 109 and the LAN interface 110 are shared with the center vibrator unit 101 as described above.

Furthermore, the weighing system 10 according to the present embodiment is provided with a weighing control unit 26 connected to the LAN cable 23 through an optical fiber 25 and a photoelectric converter 24 as shown in FIG. 1. The weighing control unit 26 includes a weighing control section 26a, an operation indicating section 26b and a display section 26c formed of a LCD or the like. The operation indicating section 26b causes the display section 26c to display a prompt screen, inputs a target weight of the articles to be weighed, upper and lower bound (limit) values thereof, switching times of the hoppers 28 and 29, delay times of various operations, and operating conditions of the feeder 21 and the like, and sets the same conditions to the CPU board 13 of the weighing unit and the weighing control section 26a. The operation indicating section 26b causes the display section 26c to properly display the weighed values of articles during operation, an average value thereof, a standard deviation, a weighing speed, hoppers used for a combination, operating conditions, operation states, the indication of an alarm, the reason(s) for an indicated alarm and the like. In the present embodiment, the weighing control section 26a performs single management of the whole weighing system 10. The photoelectric converter 24 can be housed in an I/O box or the like together with the feed—discharge control section 27 shown in FIG. 4, for example.

Actually, the weighing system 10 according to the present embodiment has an external structure shown in FIGS. 5A and 5B. As shown in FIGS. 5A and 5B, the weighing unit 11 is fixed around a center column 30, and the center vibrator 103 is fixed in the center on top of the center column 30. The collection chute 31 is provided adjacent a lower portion of the center column 30. The collating funnel 31F and the chute gate 32G are provided below the chute 31. The packer (not shown) is provided below the chute gate 32G.

Figure 6:
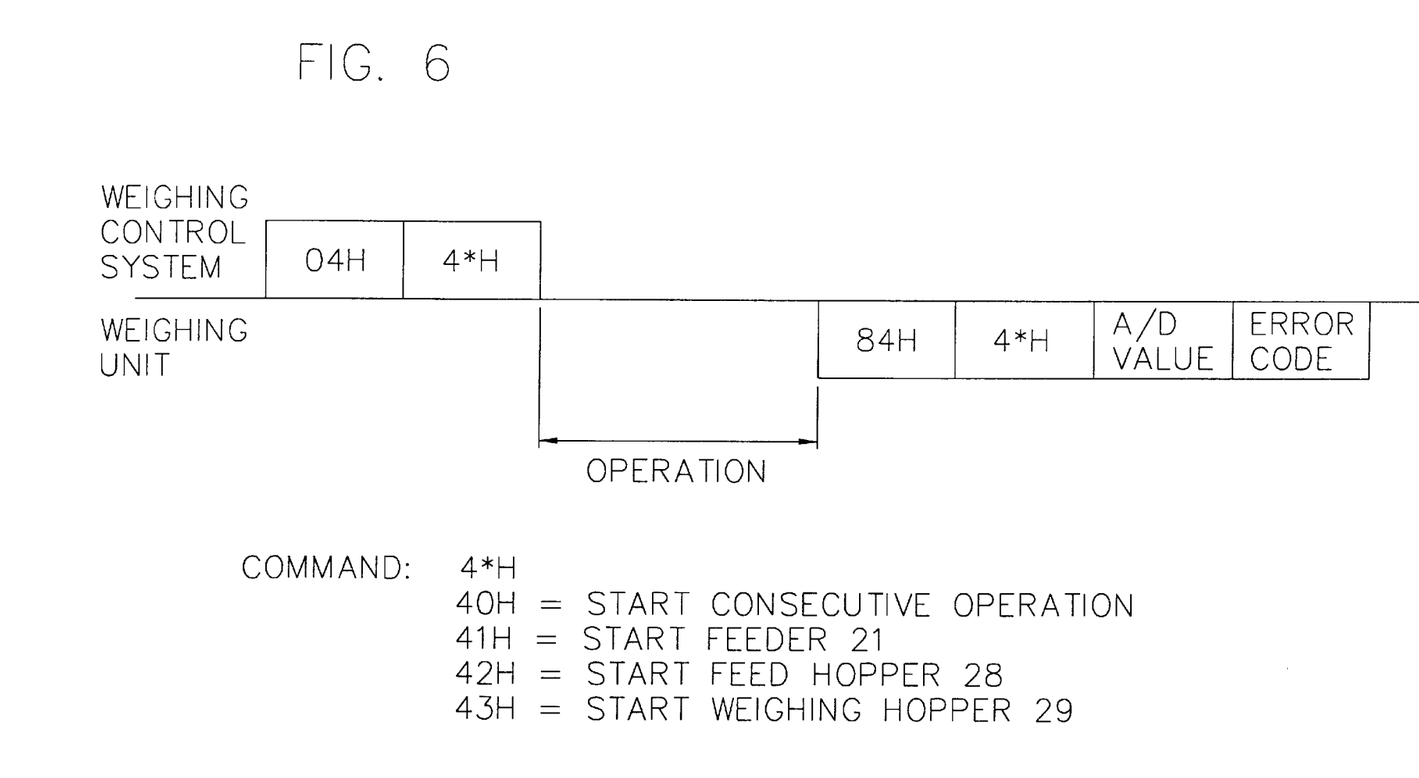
FIG. 6 is a diagram showing an example of control information to be used for the weighing system in FIG. 1.

FIG. 6 shows an example of control information to be used by the LAN shown in FIGS. 1 and 2. In the example of FIG. 6, control information in the form of "04H, 4 * H" ("H" represents a hexadecimal number) are sent from the weighing control section 26a of the weighing control unit 26 to the LAN. "04H" is a header code which means an instruction issued from the weighing control section 26a to the weighing unit 11 and represents that the next instruction "4 * H" should be executed by the weighing unit 11. The instruction "4 * H" is a general term for instructions "40H to 43H" as shown in FIG. 6. The weighing unit 11 executes the instructions "40H to 43H" shown in FIG. 6.

The weighing unit 11 which has executed the instructions "40H to 43H" sends, to the LAN, response information including "84H, 4 * H, an A/D value and an error code" as shown in FIG. 6. "84H" means a response issued from a specific weighing unit 11 to the weighing control section 26a. "4 * H" means a response to a result of execution of the instructions "40H to 43H". The A/D value is data representing the weight of the articles weighed by the weighing unit 11. The error code represents a kind of malfunction generated by the weighing unit 11.

Since the weighing system 10 according to the present embodiment sends and receives the control information, the response information and the like through the LAN cable 23 at a high speed, it is excellent in quick response to the control information and the like. Furthermore, the weighing unit can be removed and attached during operation.

In the present embodiment, the execution program of the CPU board 13 of the weighing driving section 12 is stored in the flash memory 13a as described above. If the execution program should be exchanged to perform the version up or the like, the program on which the version up has been performed is transferred from the memory 26d of the weighing control section 26a to the flash memory 13a of the weighing driving section 12 through the LAN cable 23 in the present embodiment. While the program for each weighing unit has been exchanged in the prior art, the version up can be performed on the program in a short time by using the structure of the present invention.

Furthermore, the weighing system 10 according to the present embodiment has a structure in which the weighing control section 26a detects abnormalities related to the LAN such as disconnection of the LAN cable 23 or failures of the LAN interface 22 when starting or during the operation. More specifically, the operating information necessary for the operation is sent from the weighing control section 26a to the CPU board 13 of the weighing unit 11 when starting, and it is judged that the weighing unit 11 to which a response signal is not sent within a constant time is abnormal. During the operation, various instructions are continuously sent from the weighing control section 26a to the CPU board 13 of the weighing unit 11, and it is judged that the weighing unit 11 to which a response signal is not sent within a constant time is abnormal. By this structure, abnormalities of the weighing system 10 related to the LAN can be detected easily.

While the CPU board 13 and the LAN interface 22 are separately illustrated in the present embodiment, both functions can be fulfilled by a single CPU board. Similarly, the CPU board 109 and the LAN interface 110 can be formed by a single CPU board.

Figure 7:
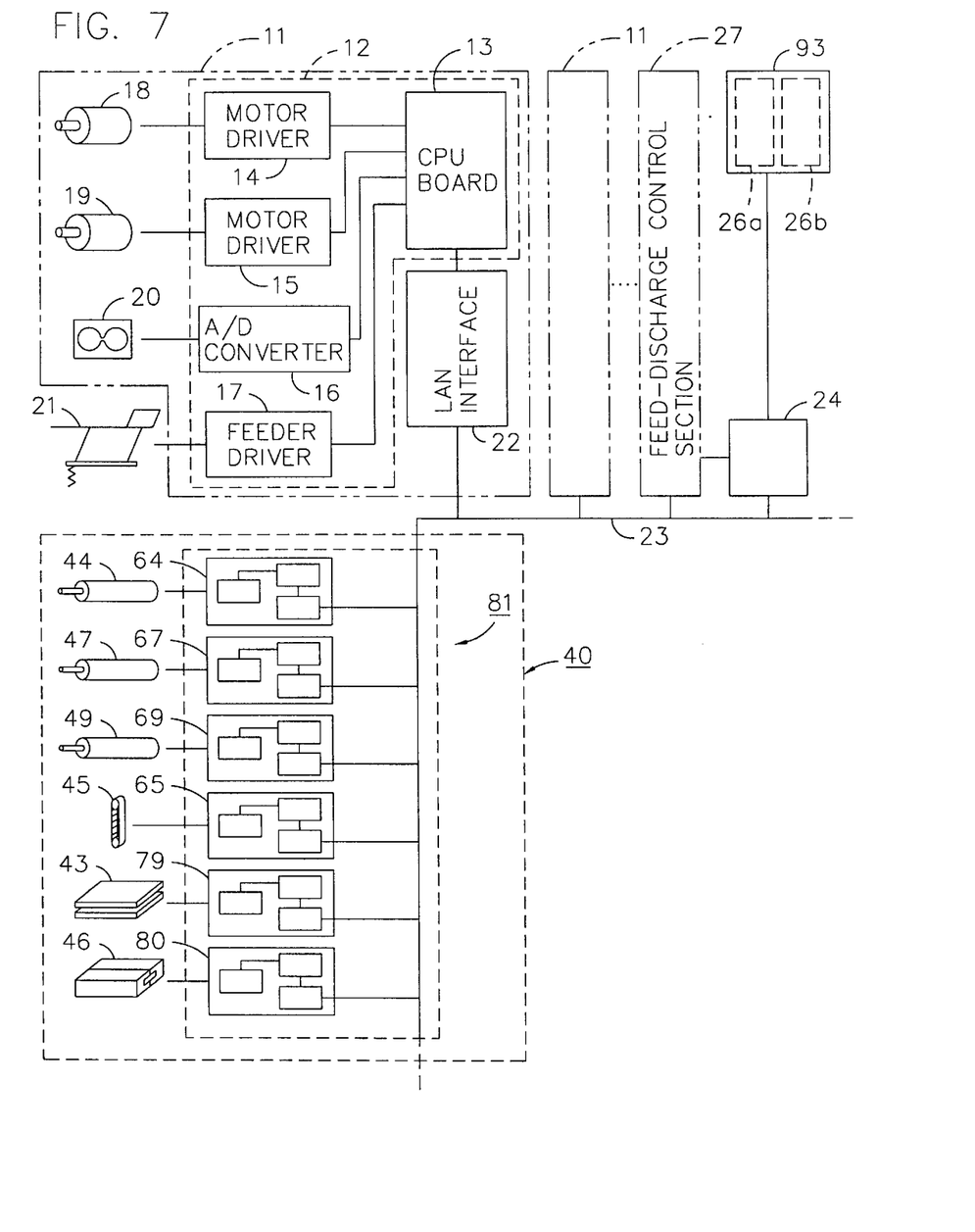
FIG. 7 is a block diagram showing a schematic structure of a weighing and packing system according to another embodiment of the present invention.

FIG. 7 shows another embodiment of the weighing system according to the present embodiment. In the weighing system according to the present embodiment, a packer 40 is connected to the LAN cable 23 in the weighing system 10 shown in FIG. 1. According to the present embodiment, a weighing control section 26a also sets operating conditions to a packing driving section 81 of the packer 40, and an operation indicating section 26b also displays an operation state of the packer 40.

Figure 8:
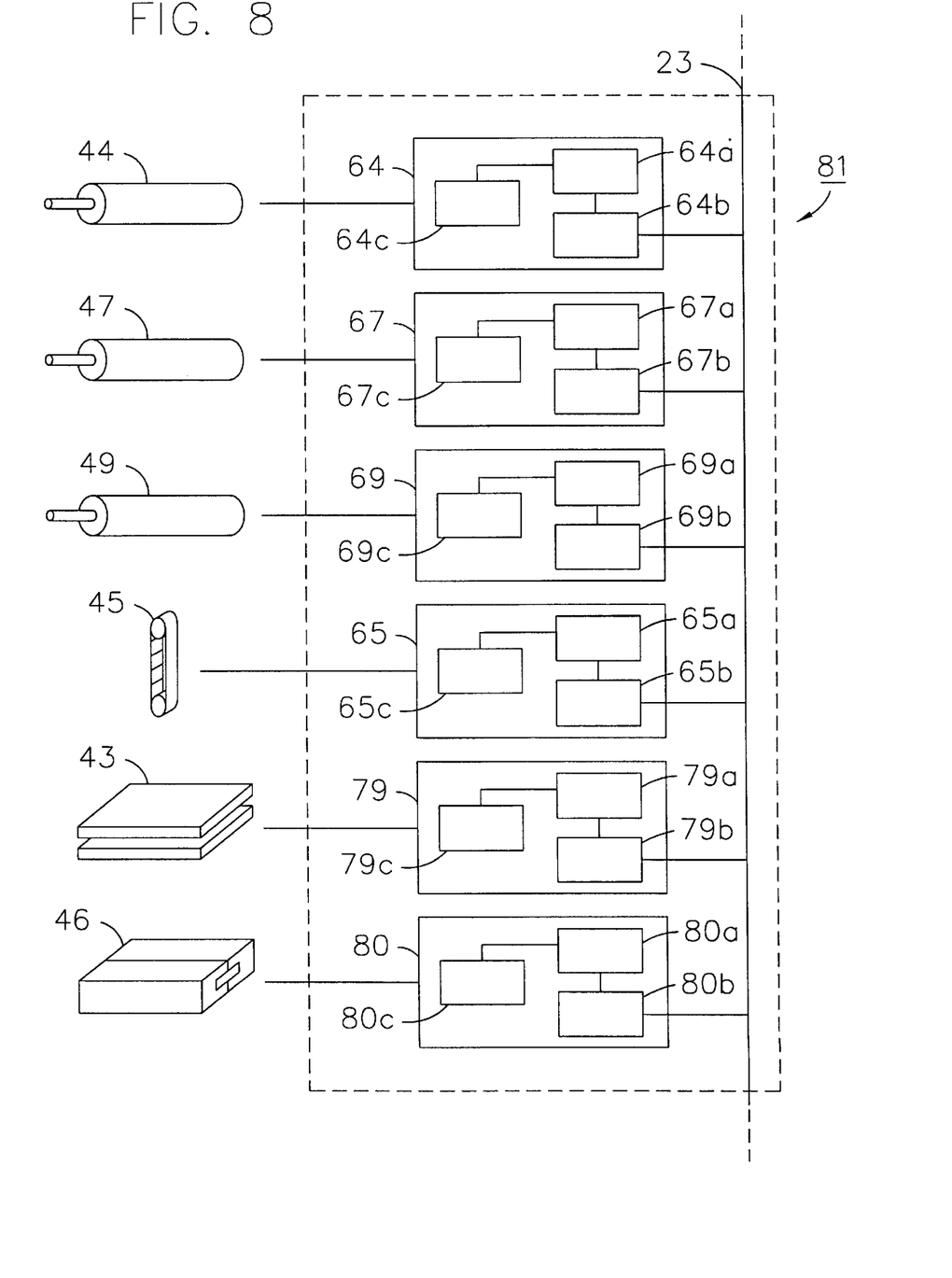
FIG. 8 is a block diagram showing a schematic structure of a packing system according to an embodiment of the present invention.

FIG. 8 shows a block structure of the packer 40. According to this embodiment, an air cylinder 44 for operating the longitudinal heat seal bars 43, an air cylinder 47 for operating the transverse heat seal bars 46, an air cylinder 49 for the cutter 48, the pull belt 45, the longitudinal heat seal bars 43 and the transverse heat seal bars 46 are connected to driving control sections 64, 67, 69, 65, 79 and 80, respectively, as shown in FIG. 9. The driving control sections 64, 67, 69, 65, 79 and 80 have CPU boards 64a, 67a, 69a, 65a, 79a and 80a, and LAN interfaces 64b, 67b, 69b, 65b, 79b and 80b, respectively. The LAN interfaces 64b, 67b, 69b, 65b, 79b and 80b are connected to the LAN cable 23. The driving control sections 64, 67, 69 and 65 connected to the air cylinder 44 for longitudinal seal, the air cylinder 47 for transverse seal, the air cylinder 49 for the cutter 48 and the pull belt 45 have drivers 64c, 67c, 69c and 65c for driving the cylinders and belt, respectively. The driving control sections 79 and 80 connected to the longitudinal heat seal bars 43 and the transverse heat seal bars 46 have temperature controllers 79c and 80c, respectively. In the present embodiment, the driving control sections 64, 67, 69, 65, 79 and 80 form a packing driving section 81.

According to the present embodiment, the air cylinder 44 for operating the longitudinal heat seal bars 43, the air cylinder 47 for operating the transverse heat seal bars 46, the air cylinder 49 for operating a cutter, the pull belt 45, the heat seal bars 43 for longitudinal sealing and the heat seal bars 46 for transverse sealing are connected to driving control sections 64, 67, 69, 65, 79 and 80, respectively, as shown in FIG. 8. The driving control sections 64, 67, 69, 65, 79 and 80 have CPU boards 64a, 67a, 69a, 65a, 79a and 80a, and LAN interfaces 64b, 67b, 69b, 65b, 79b and 80b, respectively. The LAN interfaces 64b, 67b, 69b, 65b, 79b and 80b are connected to the LAN cable 23. The driving control sections 64, 67, 69 and 65 connected to the air cylinder 44 for longitudinal sealing, the air cylinder 47 for transverse sealing, the air cylinder 49 for a cutter and the pull belt 45 have drivers 64c, 67c, 69c and 65c for driving them, respectively. The driving control sections 79 and 80 connected to the heat seal bars 43 for longitudinal sealing and the heat seal bars 46 for transverse sealing have temperature controllers 79c and 80c, respectively. In the present embodiment, the driving control sections 64, 67, 69, 65, 79 and 80 form the packing driving section 81.

In the present embodiment, the operation indicating section 26b of the weighing control unit 26 causes the display section 26c to display a prompt screen, and inputs operating conditions such as a set temperature and an operation time of each seal section of the packer 40, an operation time of the cutter, delay times of various operation and the like, and sets the same conditions to the weighing control section 26a and the CPU boards 64a, 67a, 69a, 65a, 79a and 80a. The operation indicating section 26b causes the display section 26c to properly display a temperature of each seal section, a packing speed, the operating conditions, the contents of an alarm and the like. In the present embodiment, the weighing control section 26a also performs single management of the whole packer 40.

Since the packer 40 according to the present embodiment sends and receives the control information, the response information and the like through the LAN cable 23 at a high speed, it provides a quick response to the control information and the like. Furthermore, the system can easily be varied with a change in packing form. For example, air cylinders can easily be increased or removed and sensors can easily be added or removed.

In the present embodiment, execution programs of CPUs of the CPU boards 64a, 67a, 69a, 65a, 79a and 80a of the driving control sections 64, 67, 69, 65, 79 and 80 are stored in flash memories (not shown) on the CPU boards 64a, 67a, 69a, 65a, 79a and 80a, respectively. If the execution program is replaced by an upgraded version up or the like, the program on which the upgrade has been performed is transferred from the memory 26d of the weighing control section 26a to the flash memories of the CPU boards 64a, 67a, 69a, 65a, 79a and 80a through the LAN cable 23 in the present embodiment. By this structure, it is not necessary to exchange the program of each of the driving control sections 64, 67, 69, 65, 79 and 80, and the time required to perform upgrade can be shortened.

Furthermore, the weighing system according to the present embodiment has a self diagnostic structure in which the weighing control section 26a detects abnormalities related to the LAN such as a disconnection of the LAN cable 23 or failures of the LAN interfaces 64b, 67b, 69b, 65b, 79b and 80b when starting or during the operation. By this structure, the abnormalities of the weighing system related to the LAN can easily be detected in the same manner as in the embodiment shown in FIG. 1.

While the CPU boards 64a, 67a, 69a, 65a, 79a and 80a and the LAN interfaces 64b, 67b, 69b, 65b, 79b and 80b are provided on the driving control sections 64, 67, 69, 65, 79 and 80 of the air cylinders 44, 47 and 49, the belt 45, and the heat seal bars 43 and 46 respectively in the present embodiment, the CPU boards and the LAN interfaces can be collected together such that the air cylinders 44, 47 and 49, the belt 45, and the heaters 43 and 46 are controlled by a single board which functions as both a CPU and a LAN interface.

The weighing system according to the present invention has a structure in which the weighing driving section of the weighing unit is connected to the weighing control unit through the LAN. Therefore, the weighing system is capable of performing high-speed communication, and is excellent in quick response to the control information, the operating information and the like. By employing the LAN, the execution program of the weighing driving section can be replaced at high speed with an upgraded version or the like. Furthermore, the functionality of the LAN is utilized so that abnormalities of the system related to the LAN can be diagnosed easily. In addition, weighing units can be increased or removed easily.

Although the present invention has fully been described by way of example with reference to the accompanying drawings, it is to be understood that various changes and modifications will be apparent to those skilled in the art. Therefore, unless otherwise such changes and modifications depart from the scope of the invention, they should be construed as being included therein.

What is claimed is:

1. A weighing system comprising:

a plurality of weighing units forming a combination scale;

a weighing driving section provided on each of the weighing units for causing the weighing unit to perform weighing operation, each said weighing driving section having a CPU for operating its respective weighing unit;

a weighing control unit having a CPU and including a weighing control section for controlling the weighing driving section, and an operation indicating section for setting operating conditions of the weighing system and for displaying an operation state;

a local area network (LAN) for mutually connecting the CPU of the weighing driving section and the CPU of the weighing control unit; and an LAN interface for each of the weighing driving sections interconnecting each CPU of each weight driving section to the LAN so that communications between the CPUs of the weight driving sections and the CPU of the weighing control unit are via the LAN interface and the LAN wherein the weighing control section of the weighing control unit has program transferring means for transferring an execution program to the weighing driving section through the LAN.

2. A weighing system comprising:

a plurality of weighing units forming a combination scale;

a weighing driving section provided on each of the weighing units for causing the weighing unit to perform weighing operation, each said weighing driving section having a CPU for operating its respective weighing unit;

a weighing control unit having a CPU and including a weighing control section for controlling the weighing driving section, and an operation indicating section for setting operating conditions of the weighing system and for displaying an operation state;

a local area network (LAN) for mutually connecting the CPU of the weighing driving section and the CPU of the weighing control unit; and an LAN interface for each of the weighing driving sections interconnecting each CPU of each weight driving section to the LAN so that communications between the CPUs of the weight driving sections and the CPU of the weighing control unit are via the LAN interface and the LAN wherein each of the weighing driving sections has a memory storing a program for operating its respective CPU whereby the program of the CPU of one of the weight driving sections may be upgraded or may be different from the programs of the CPUs of the other weight driving sections.

3. The weighing system as defined in claim 1, wherein the weighing control section of the weighing control unit has a self-diagnostic function of detecting abnormalities of the LAN.

4. The weighing system as defined in claim 1, wherein each weighing unit includes a weigh hopper for holding articles to be weighed, said weigh hopper having a gate movable from a closed position to an open position for discharging articles from the weigh hopper, an actuating device for opening and closing the gate of the weigh hopper, and one or more load cells, weighing driving section including a driver for driving the actuating device, and an A/D converter for A/D converting a weighed value from the load cell.

5. The weighing system as defined in claim 4, further comprising a center vibrator unit connected to the LAN for feeding articles to be weighed to the weighing unit, the center vibrator unit including a center vibrator for feeding articles to the weighing unit by vibration, a feeder driver for driving the center vibrator, article detecting means for detecting a quantity of articles on the center vibrator, and digital converting means for converting an input signal from the article detecting means to a digital signal.

6. The weighing system as defined in claim 4 further comprising a collection chute for collecting weighed articles discharged from said weighing units, said collection chutes having a collection chute gate movable between a closed position and an open position for discharging articles in the collection chute for delivery to a packer, and gate actuator means connected to the LAN for opening and closing the collection chute gate in timed relationship with the operation of the packer.

7. The weighing system as defined in claim 5, further comprising a collection chute for collecting weighed articles discharged from said weighing units, said collection chutes having a collection chute gate movable between a closed position and an open position for discharging articles in the collection chute for delivery to a packer, and gate actuator means connected to the LAN for opening and closing the collection chute gate in timed relationship with the operation of the packer.

8. The weighing system as defined in any of claims 1, 3 to 6, wherein the weighing control section of the weighing control unit also sets operating conditions to a packing driving section provided on a packer for packing articles discharged from the weighing system, and the operation indicating section also displays an operation state of the packer.

9. The weighing system as defined in claim 8, wherein the packer is operable to make bags for receiving quantities of articles by the combination scale, said packer comprising one or more heat seal bars for sealing film to make said bags, one or more belts for filling said film, one or more sensors, and one or more actuators for opening and closing the heat seal bags, and the packing driving section includes a driver for driving the actuators, a driver for driving the belt, a controller for controlling one or more sensors, and a controller for controlling the temperature of the seal bags.

10. A weighing system comprising:

a plurality of weighing units forming a combination scale;

a weighing driving section provided on each of the weighing units for causing the weighing unit to perform weighing operation, each said weighing driving section having a CPU for operating its respective weighing unit;

a weighing control unit having a CPU and including a weighing control section for controlling the weighing driving section, and an operation indicating section for setting operating conditions of the weighing system and for displaying an operation state;

a local area network (LAN) for mutually connecting the CPU of the weighing driving section and the CPU of the weighing control unit; and an LAN interface for each of the weighing driving sections interconnecting each CPU of each weight driving section to the LAN so that communications between the CPUs of the weight driving sections and the CPU of the weighing control unit are via the LAN interface and the LAN wherein each of the weighing driving sections has a memory storing a program for operating its respective CPU and wherein each of the programs for the weighing driving sections can be exchanged or updated via the LAN.

11. A weighing system comprising:

a plurality of weighing units forming a combination scale;

a weighing driving section provided on each of the weighing units for causing the weighing unit to perform weighing operation, each said weighing driving section having a CPU for operating its respective weighing unit;

a weighing control unit having a CPU and including a weighing control section for controlling the weighing driving section, and an operation indicating section for setting operating conditions of the weighing system and for displaying an operation state;

a local area network (LAN) for mutually connecting the CPU of the weighing driving section and the CPU of the weighing control unit; and an LAN interface for each of the weighing driving sections interconnecting each CPU of each weight driving section to the LAN so that communications between the CPUs of the weight driving sections and the CPU of the weighing control unit are via the LAN interface and the LAN wherein the LAN interface has a memory wherein each of the weighing driving sections has a program stored in the memory of the LAN interface for operating its respective CPU, wherein the weighing control unit has a memory and wherein the program for the CPU of each of the weight driving sections is upgraded by transferring data from the memory of the weighing control unit via the LAN to the memory of the LAN interface.

* * * * *